A. BOSWELL.
ANIMAL TRAP.
APPLICATION FILED NOV. 4, 1912.
1,132,428.
Patented Mar. 16, 1915.
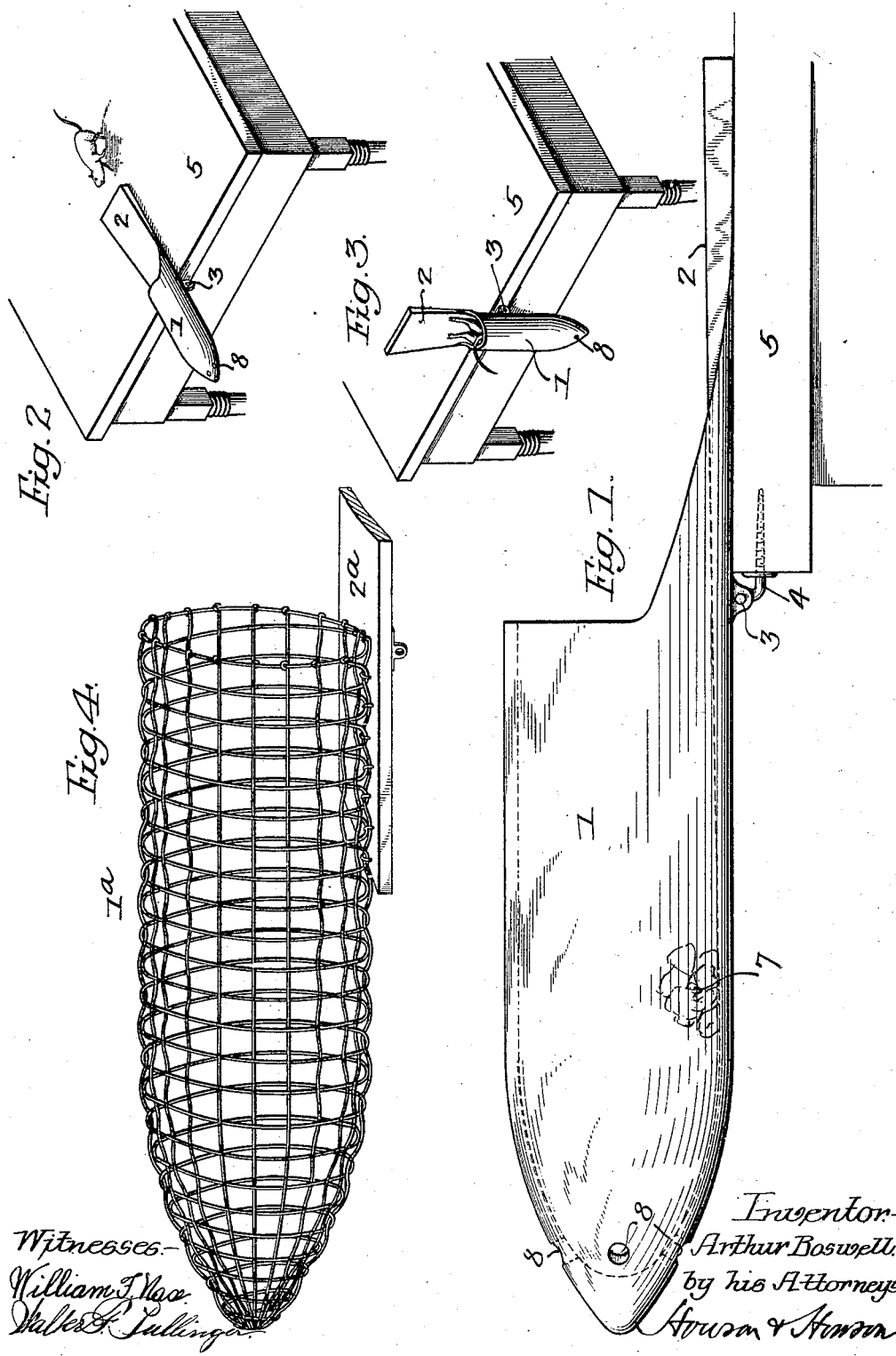

UNITED STATES PATENT OFFICE.

ARTHUR BOSWELL, OF PHILADELPHIA, PENNSYLVANIA.

ANIMAL-TRAP.

1,132,428.  Specification of Letters Patent.  Patented Mar. 16, 1915.

Application filed November 4, 1912. Serial No. 729,445.

*To all whom it may concern:*

Be it known that I, ARTHUR BOSWELL, a citizen of the United States, residing in Philadelphia, Pennsylvania, have invented certain Improvements in Animal-Traps, of which the following is a specification.

My invention relates to animal traps, and the object of my invention is to provide a pivotally mounted structure that will be overbalanced by the entrance of the animal and thereby change its position so as to entrap the animal and insure the capture of the same. I may further provide the structure with means to catch and retain the animal after it has entered the trap and tipped the same.

My invention comprises a structure which may be pivotally hung to a shelf, table top or other suitable place, and consists of a receptacle with which is combined a weighted platform; the whole being suitably supported as by providing an apertured lug or other means on the under side for engagement with a hook. These and other features of my invention will be more fully described hereinafter, reference being had to the accompanying drawings forming part thereof, in which:

Figure 1, is a view in elevation of an animal trap made in accordance with my invention; Fig. 2, is a perspective view showing the position of use; Fig. 3, is a perspective view showing the trap with an animal caught thereby, and Fig. 4, is a view illustrating a modified construction within the scope of my invention.

In the drawings, 1 represents a suitable receiver, which may be made of glass, metal or other suitable material, and in the present instance it is shown in Fig. 1, as made of glass. This receiver is provided with a platform 2, which may be integral therewith, overlying a table top or shelf and the structure is provided with a lug 3 or other suitable means whereby it may be pivotally connected to a hook 4 carried by said table top or shelf; the latter being indicated at 5. The platform is designed to counterbalance the structure so that when set it will be normally supported in the position shown. The receiver may carry a suitable bait as indicated at 7, and by preference, this receiver is apertured as indicated at 8 or at the extreme end in order that the inner air of the same may be kept perfectly fresh. The animal—mouse, rat, or the like, passing into the receptacle to secure the bait will overbalance the structure, causing it to turn upon its pivot, thereby trapping itself therein in the manner indicated in Fig. 3.

In some instances, it may be possible or desirable to make a structure of woven wire, as illustrated at 1ª in Fig. 4, which may be properly secured to a separate platform 2ª and pivotally mounted in the same manner as the structure illustrated in Figs. 1, 2 and 3. The receiver may also have projections or other devices on its inner side to prevent any possibility of the animal escaping, or may be so constructed of flexible material as to more firmly hold the animal the more it struggles.

The receiver as noted has the full opening so as to provide ready entrance for an animal without obstruction, and the end of the receiver may be the conical shape disclosed or not as desired so that the animal's head will be crowded into the same when precipitated into the receiver. When of wire, the construction may be such that the wire will tend to stretch and tend to grip the animal in its struggles to escape.

I claim:

An animal trap comprising a receiver, a pivotal support therefor, said receiver having one end closed and tapering and having, also, an uninclosed platform extension of the other end serving as a counterweight for the receiver, said tapering end of the receiver being provided with air inlets.

In testimony whereof, I have signed my name to this specification, in the presence of two subscribing witnesses.

ARTHUR BOSWELL.

Witnesses:
 MURRAY C. BOYER,
 WM. E. SHUPE.